US 6,748,935 B2

(12) United States Patent
Brosseau et al.

(10) Patent No.: US 6,748,935 B2
(45) Date of Patent: Jun. 15, 2004

(54) INTEGRATED INTAKE MANIFOLD ASSEMBLY FOR AN INTERNAL COMBUSTION ENGINE

(75) Inventors: Michael R. Brosseau, Rochester, NY (US); Roger M. Brisbane, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 10/165,138

(22) Filed: Jun. 7, 2002

(65) Prior Publication Data

US 2003/0000506 A1 Jan. 2, 2003

Related U.S. Application Data

(60) Provisional application No. 60/301,734, filed on Jun. 28, 2001.

(51) Int. Cl.[7] .............................................. F02M 25/07
(52) U.S. Cl. .............................. 123/568.18; 123/568.19
(58) Field of Search ........................... 123/184.21, 306, 123/568.17, 568.18, 568.19, 568.11

(56) References Cited

U.S. PATENT DOCUMENTS

| 4,027,636 | A | | 6/1977 | Yamamoto et al. | |
|-----------|---|---|--------|-----------------|--|
| 4,228,773 | A | * | 10/1980 | Stumpp et al. | 123/505 |
| 4,329,965 | A | * | 5/1982 | Ueda et al. | 123/568.18 |
| 5,988,147 | A | * | 11/1999 | Everingham | 123/568.18 |
| 6,571,782 | B2 | * | 6/2003 | Brosseau et al. | 123/568.18 |

FOREIGN PATENT DOCUMENTS

| DE | 10028131 | 12/2001 |
|----|----------|---------|
| EP | 0886063 | 12/1998 |
| EP | 0900930 | 3/1999 |
| FR | 2818316 | 6/2002 |

* cited by examiner

Primary Examiner—Tony M. Argenbright
Assistant Examiner—Hyder Ali
(74) Attorney, Agent, or Firm—Patrick M. Griffin

(57) ABSTRACT

An integrated intake manifold assembly including a poppet valve disposed at the air inlet to the manifold to regulate air flow into the manifold; a poppet valve disposed on the manifold to regulate exhaust gas flow into the air intake system; and a bi-directional camshaft with cams for operating simultaneously the manifold vacuum regulating (MVR) valve and the exhaust gas recirculation (EGR) valve. The valve bodies are integrally formed in the wall of the intake manifold. The camshaft is driven by a DC motor and gear train. The cams are arranged on the shaft to provide optimum synchronized opening and closing of the related valves. When used on a diesel engine, the assembly may further include a swirl valve plate disposed between the manifold and the engine head and having a plurality of ganged swirl valves actuated by levers connected to the camshaft for coordinated motion with the MVR and EGR valves. Preferably, the swirl valve plate is also ported as a distribution rail to receive exhaust gas from the single EGR valve and distribute it to the individual cylinders. The valve stems of the MVR and EGR valves are modified as forked yokes engaging the camshaft to minimize side loading of the valve stems by the cams.

12 Claims, 12 Drawing Sheets

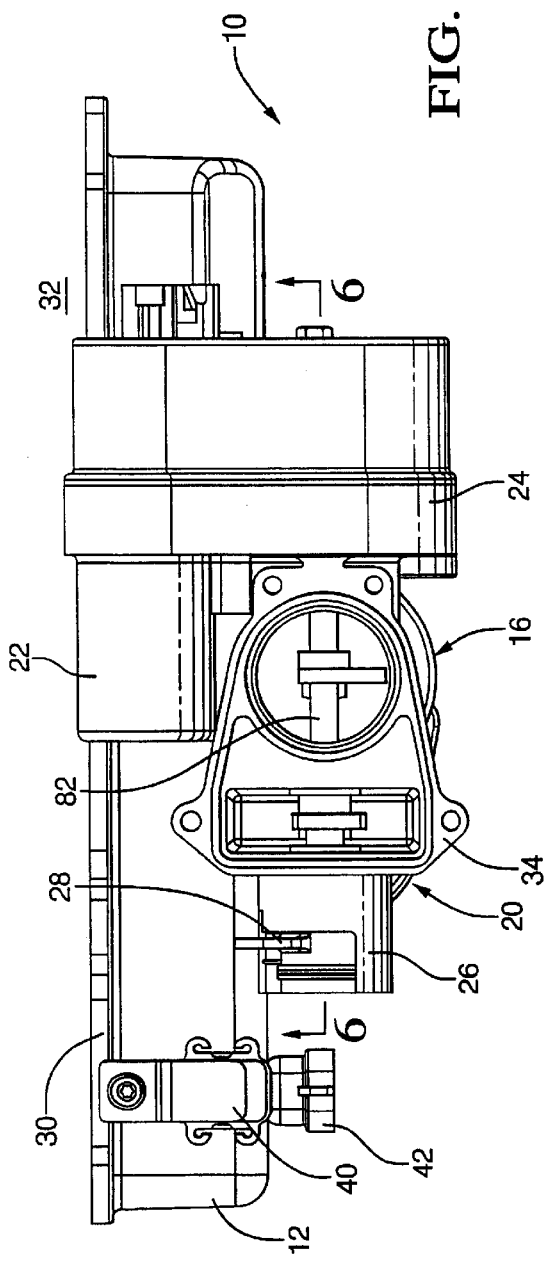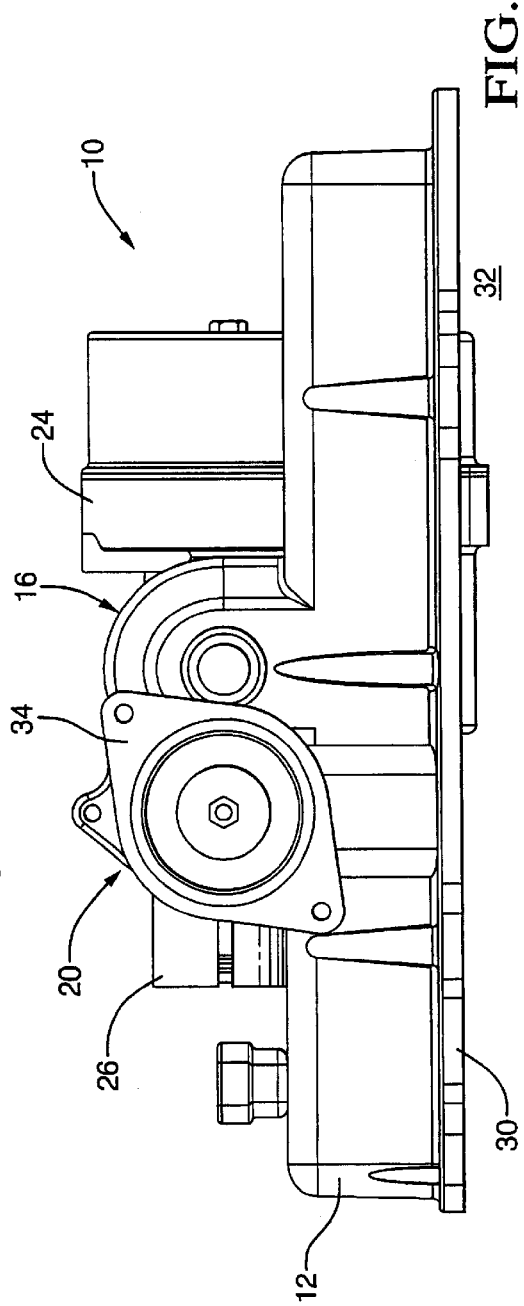

INTEGRATED INTAKE MANIFOLD ASSEMBLY FOR AN INTERNAL COMBUSTION ENGINE

CROSS-REFERENCE TO RELATED APPLICATIONS

This application claims priority from U.S. Provisional Patent Application No. 60/301,734, filed Jun. 28, 2001.

TECHNICAL FIELD

The present invention relates to systems and apparatus for managing gas flow through internal combustion engines; more particularly, to one or more valving devices associated with the intake manifold of an internal combustion engine; and most particularly, to an intake manifold assembly for an internal combustion engine, such as a diesel engine or a variable valve lift gasoline engine, wherein an exhaust gas recirculation valve, a manifold vacuum control valve, and other gas-control valves as may be necessary, are integrated into the assembly.

BACKGROUND OF THE INVENTION

It is a characteristic of diesel engines and some variable valve lift gasoline engines that virtually no vacuum exists in the intake manifolds of such engines. The lack of vacuum creates problems in providing vacuum-assisted functions for applications such as automotive vehicles, marine vessels, and stationary power generators. A conventional gasoline-powered engine includes a throttle valve at the inlet to the intake manifold to control the flow of air into the engine and thereby to regulate the speed of the engine. Such throttling of the inlet variably creates a subatmospheric condition in the manifold. Recirculation of exhaust gas into the intake manifold uses a pressure drop between the exhaust manifold and the intake manifold to draw exhaust gas into the intake manifold. Such a pressure drop is virtually non-existent in an unmodified diesel engine and also in a gasoline engine wherein gas flow is controlled by varying the lift of the intake valves.

It is known to create manifold vacuum in a diesel intake manifold by providing an air control valve at the manifold inlet, typically a rotary butterfly-type valve. Such a valve is typically actuated by an electric motor and gear train or a stepper motor and is provided as a subassembly which must be attached to the manifold as by bolting and which requires its own power and control connections in a wiring harness. Disadvantageously, a rotary butterfly valve has a highly non-linear flow profile as a function of valve angle; is difficult to close completely without jamming; and typically passes significant air flow in the "closed" position.

It is further known to provide an exhaust gas recirculation (EGR) valve having its own actuator and valve body which also must be bolted to the intake manifold. EGR valves typically are actuated by an electric solenoid in either a position-modulated or time-modulated mode, requiring additional and separate power and control connections. Further, such solenoids are known to be vulnerable to failure from corrosion by permeated exhaust gas. Prior art EGR valves provide exhaust gas globally to the interior of the intake manifold which then distributes the gas along with intake air via runners to the individual cylinders.

It is further known to provide dual intake ports to each diesel cylinder, one such port being open at all times and the other such port being closable by a butterfly-type valve. The ports are off-axis of the cylinders such that when the valves are closed, as under low engine load conditions, air entering the cylinder is swirled advantageously to center the fuel charge in the cylinder. Typically, the individual valves are actuated by, for example, electrically-powered rotary actuators similar to that known for a throttle valve.

It is a principal object of the present invention to simplify an air intake manifold and associated control valving for a diesel engine, valve-lift controlled gasoline engine, or other gasoline engine, to reduce manufacturing cost, ease assembly, improve and integrate air control through an engine, and increase engine reliability.

It is a further object of the invention to mechanically link and actuate such valving.

SUMMARY OF THE INVENTION

Briefly described, an integrated intake manifold assembly in accordance with the invention includes a poppet manifold vacuum regulating valve (MVR valve) disposed at the air inlet to the manifold to regulate air flow into the manifold; a poppet EGR valve disposed on the manifold to regulate exhaust gas flow into the air intake system; and a bi-directional camshaft and cams for operating simultaneously the MVR valve and the EGR valve. The valve bodies are integrally formed in the wall of the intake manifold. The camshaft is driven by a single brush DC motor and gear train. The cams are arranged on the shaft to provide optimum synchronized opening and closing of the related valves. The cams may also be individually shaped as needed to optimize the actuation profile of each valve. When used on a diesel engine, the assembly may further include a swirl valve plate disposed between the manifold and the engine head and having a plurality of ganged swirl valves actuated by linkage connected to the camshaft for coordinated motion with the MVR and EGR valves. Preferably, the swirl valve plate is also ported as a distribution rail to receive exhaust gas from the EGR valve and distribute it to the individual cylinders, bypassing altogether the interior of the intake manifold and obviating soot deposits in the manifold. Preferably, the valve stems of the MVR and EGR valves are modified as forked yokes which engage the camshaft as reciprocating struts to minimize side loading of the valve stems by the rotary action of the cams.

An integrated intake manifold assembly in accordance with the invention, when compared to prior art assemblies of stand-alone components, eliminates eight bolts and two gaskets; eliminates two actuators and related wiring; eliminates vacuum actuation and hoses; reduces soot in the air intake system, protecting air components; reduces electrical connections to two; simplifies manufacture and assembly; and reduces the overall size and mass of the air control system.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 3 is a plan view of the embodiment from above, without the swirl plate;

FIG. 4 is a plan view of the embodiment from below, without the swirl plate;

DESCRIPTION OF THE PREFERRED EMBODIMENTS

Figure 1:
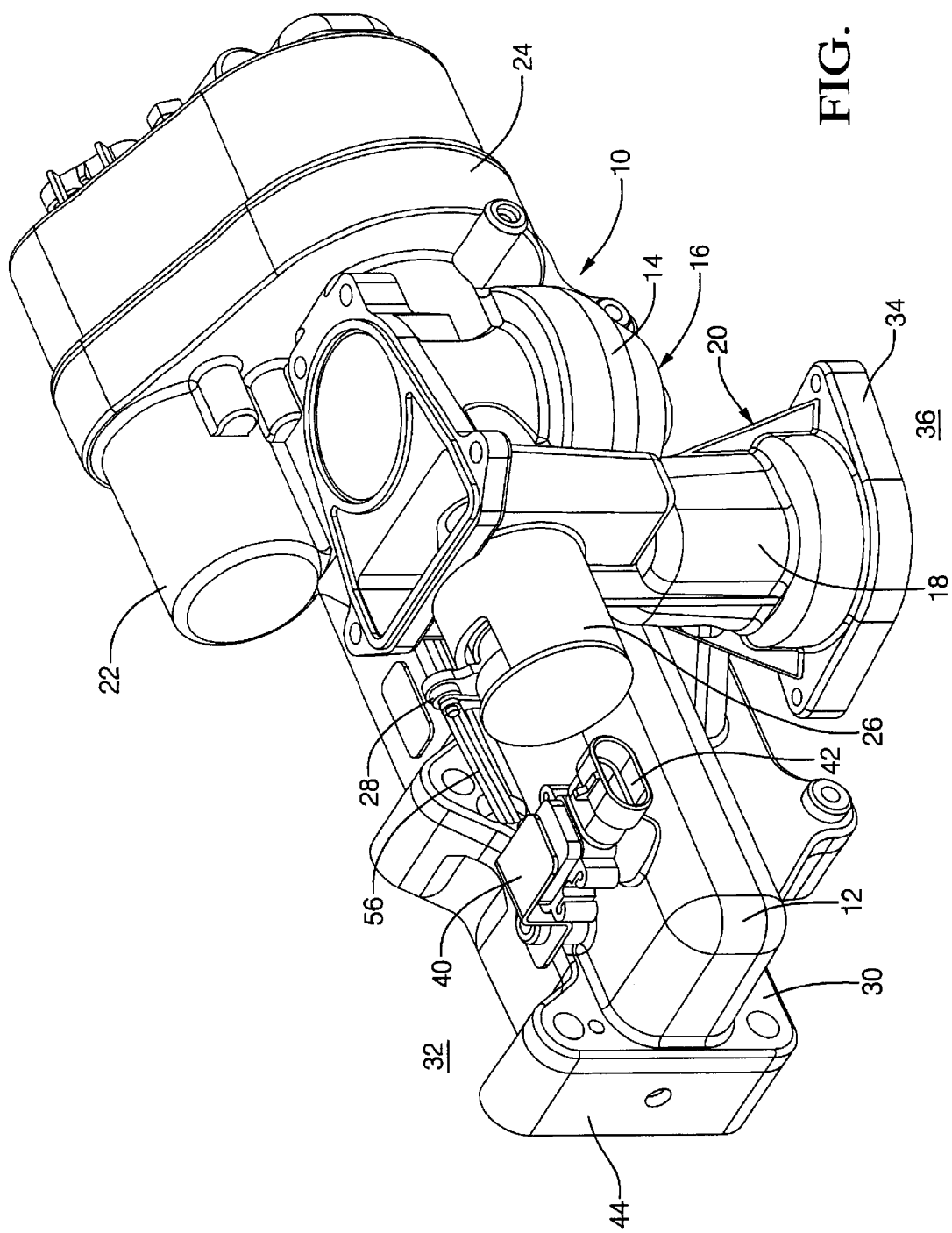
FIG. 1 is an isometric view from above of an embodiment of the invention, including an associated swirl plate.

In the following description, the embodiment is assumed to be oriented such that an associated engine is beside, and an exhaust manifold below, the embodiment. The use of the terms up, down, upper, lower, above, and below assume such an orientation.

Referring to FIGS. 1 through 4, an integrated intake manifold assembly 10 in accordance with the invention includes an intake manifold element 12 preferably formed as by die casting of metal such as aluminum alloy. Formed integrally with element 12 are a first housing 14 for a MVR valve assembly 16; a second housing 18 for an EGR valve assembly 20; a third housing 22 for a drive motor (not visible in these drawings); a fourth housing 24 for a gear train (also not visible); a fifth housing 26 for a lever actuator 28 attached to a camshaft 82; a first mounting flange 30 for attaching assembly 10 to an engine block or head 32; a second mounting flange 34 for attaching assembly 10 to an exhaust manifold 36; and a receptacle 38 for mounting of a manifold vacuum sensor 40 having an electrical connector 42 for conventional connection to an engine control module (ECM) (not shown). Unlike prior art intake manifolds in which MVR valves and EGR valves are assembled onto a manifold and require independent electrical actuation, position sensing, and control, the present MVR and EGR valves are integrally formed into the manifold itself and mechanically actuated by a common camshaft, as described further below.

Attached to, but separate from, integrated intake manifold assembly 10 is a swirl valve plate 44 disposed between assembly 10 and engine 32. Plate 44 includes first ports 46, for distributing air from manifold 12 into each of four engine cylinders (not shown) under low engine load, and second ports 48 in flow parallel with first ports 46 for providing additional air under high load conditions. Air flow from manifold 12 through second ports 48 may be regulated by swirl control valves 50 which are ganged for unified action by being mounted on a single control shaft 52 extending through axially aligned bores 54 in plate 44. A link 56 connects first lever actuator 28 with a similar second lever actuator 58 (FIGS. 8, 18, and 19) attached to shaft 52. When valves 50 are closed, air is introduced tangentially to the cylinders only via ports 46, causing a swirling motion which tends to desirably center the fuel charge on the piston. Under high air and fuel volumes, when valves 50 are open, such swirling is unimportant and is eliminated.

Figure 8:
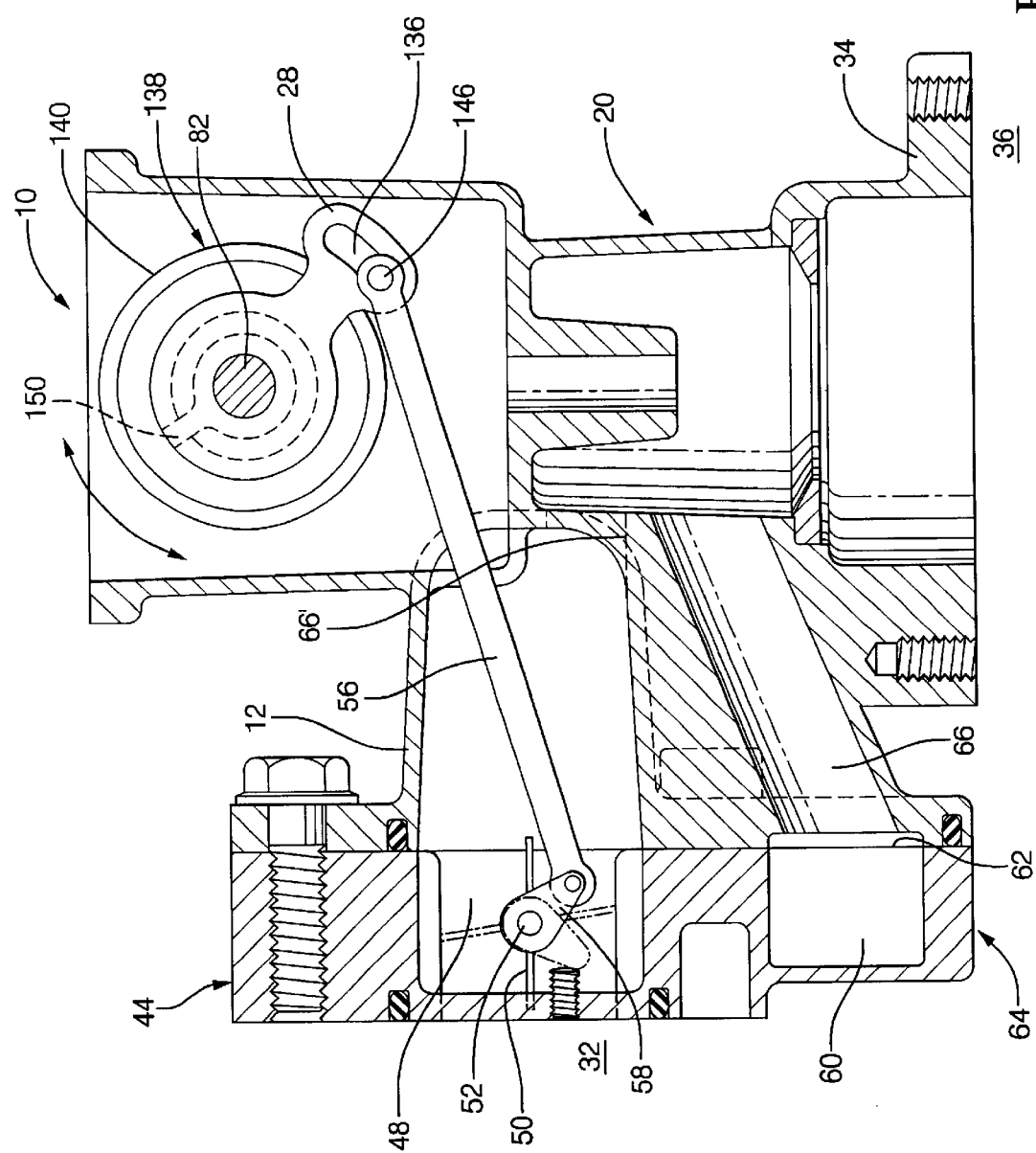
FIG. 8 is an elevational cross-sectional view of an alternative arrangement of linkage between the camshaft and the swirl valve shaft, showing also the distribution of exhaust gas from the EGR valve through an exhaust gas distribution rail.

Such linkage may be attached to actuator 28 either above the axis of rotation, as shown for example in FIGS. 1, 2, 5, and 16–19, or below the axis of rotation, as shown in FIG. 8. The arrangement shown in FIG. 8 allows for the actuation of a swirl-port system with no linkages external to the intake manifold. All of the components of this mechanism thus may be hidden internally, within the intake manifold and swirl plate, by appropriately configuring the manifold. After the assembly is mounted to the engine, all moving parts are concealed and protected from the environment, providing a safe, robust assembly.

Preferably, plate 44 is also provided with a longitudinal channel 60 matable with a similar channel 62 formed in assembly 10 to form an exhaust gas distribution rail 64 supplied with exhaust gas via an exhaust gas conduit 66 from EGR valve assembly 20. Rail 64 is connected via individual runners (not visible) to each of first ports 46 for dispensing exhaust gas into each of the cylinders of engine 32. This arrangement thus accomplishes controlled exhaust gas recirculation to the cylinders without exposing the interior of the intake manifold to soot and corrosive oxides. Of course, for simplicity of construction, an integrated EGR valve assembly 20 in accordance with the invention may simply feed exhaust gas via a conduit 66' analogous to conduit 66 directly into intake manifold 12 for distribution with air into the cylinders, as in the prior art. Further, in some applications of the invention to spark-ignited gasoline powered engines, the swirl plate is not needed and distribution of EGR to the individual cylinders is not required, in which case assembly 10 is mounted directly onto engine 32, and conduit 66' represents the preferred embodiment.

In gasoline engines throttled by variable valve lift, valve assembly 16 may function as a manifold vacuum regulating valve, substantially as in a diesel engine as described herein. However, in gasoline engines throttled conventionally by a manifold inlet valve, an integrated intake manifold assembly in accordance with the invention may be usefully adapted for conventional throttle control by valve assembly 16.

Referring to FIGS. 5, 6, 13, and 14, the mechanism 68 of the invention is housed in the various integrated housings formed in manifold 12, as recited above.

The power train is a conventional motor and reduction gear train. A single brush DC motor 70, housed in third housing 22, is provided with a first pinion gear 72 which meshes with first ring gear 74 mounted on an idle shaft 76. Second pinion gear 78, attached to first ring gear 74, meshes with second ring gear 80 which is mounted on camshaft 82 via an output spring 84. A camshaft position sensor 79 is disposed on the proximal end 81 of camshaft 82. The gear train and position sensor are housed in a cover 83 boltable to the intake manifold. An electrical connector 85 provides power and operating signals to the motor and carries information from position sensor 79 to the ECM.

Camshaft 82 is journalled in three sets of ball bearings 87 retained in bearing mounts formed in intake manifold 12. MVR cam 86 and EGR cam 88, having throughbores, are mounted on camshaft 82 at predetermined axial locations and at a predetermined angular relationship to each other. After the cams have been properly positioned during assembly, they are fixed in place by set screws 90. Preferably, after assembly and testing, the cams are drilled and pinned 91 to the camshaft.

Figure 9:
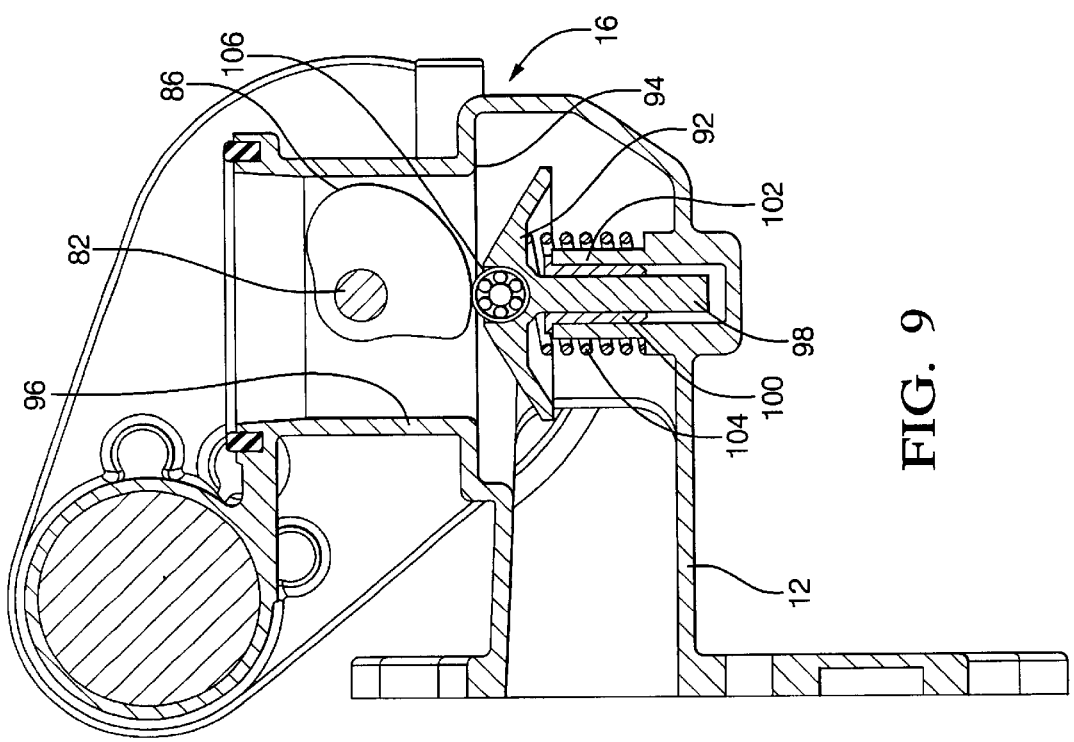
FIG. 9 is an elevational cross-sectional view of the manifold vacuum regulation valve, taken along line 9—9 in FIG. 7.
Figure 12:
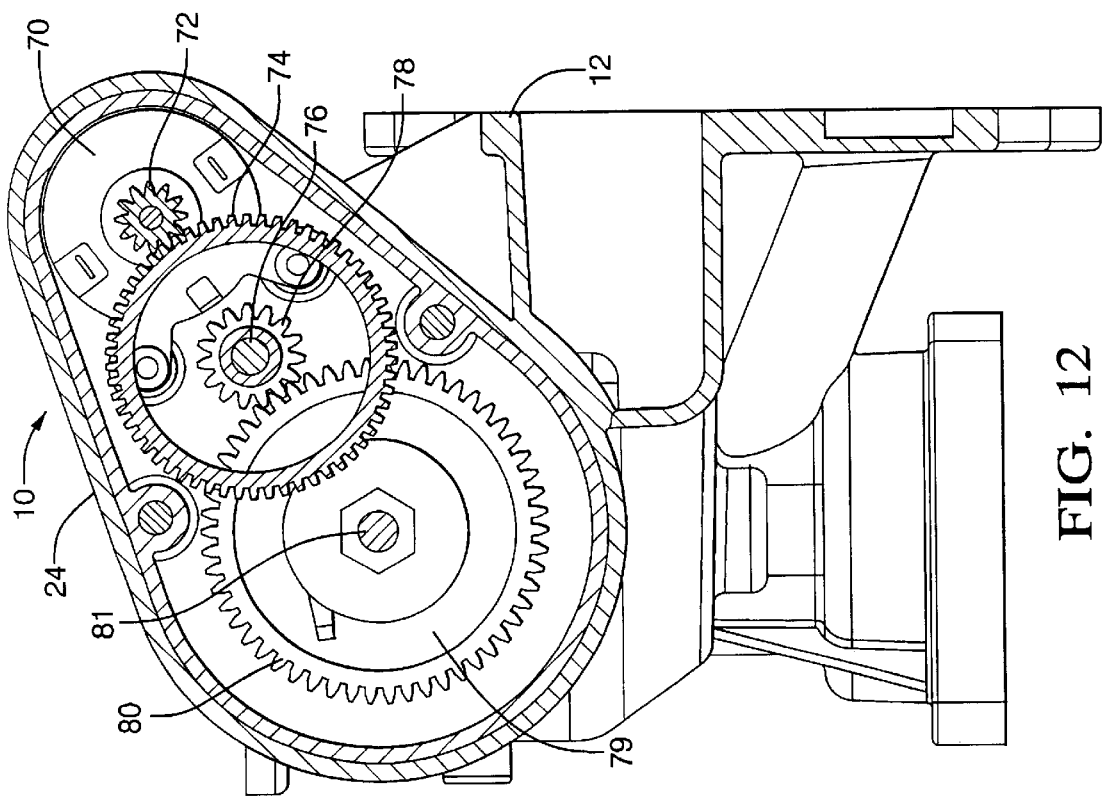
FIG. 12 is an elevational cross-sectional view of the motor and gear train which actuates the camshaft, taken along line 12—12 in FIG. 7.
Figure 11:
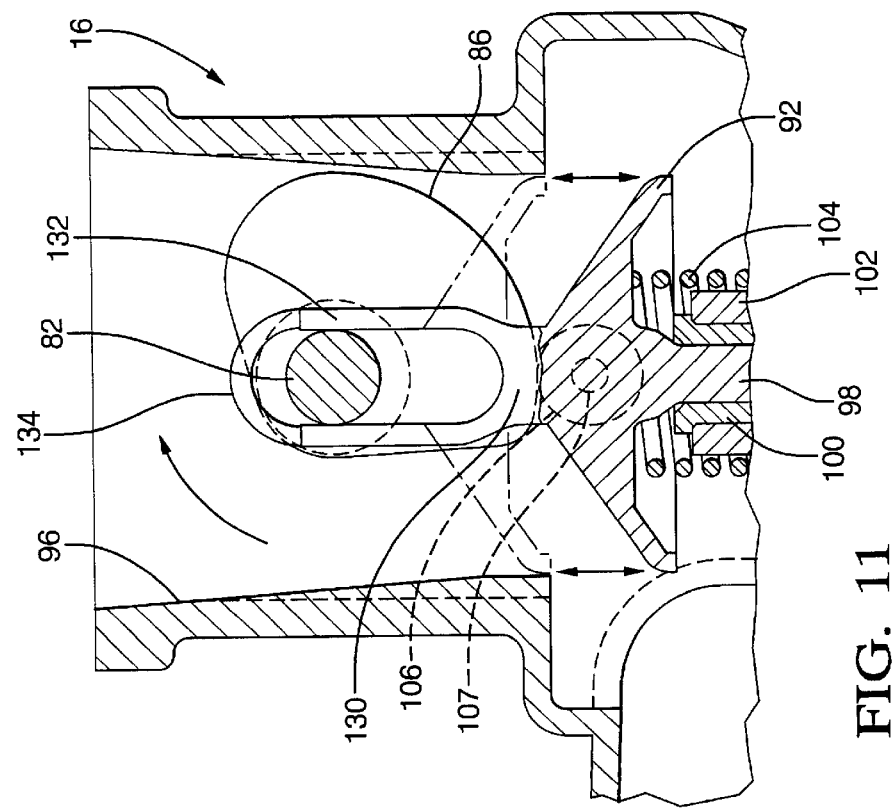
FIG. 11 is a detailed elevational cross-sectional view of the manifold vacuum regulation valve, showing the incorporation of a reciprocating yoke to limit side-loading of the valve stem in its sleeve bearing.
Figures 13, 14:
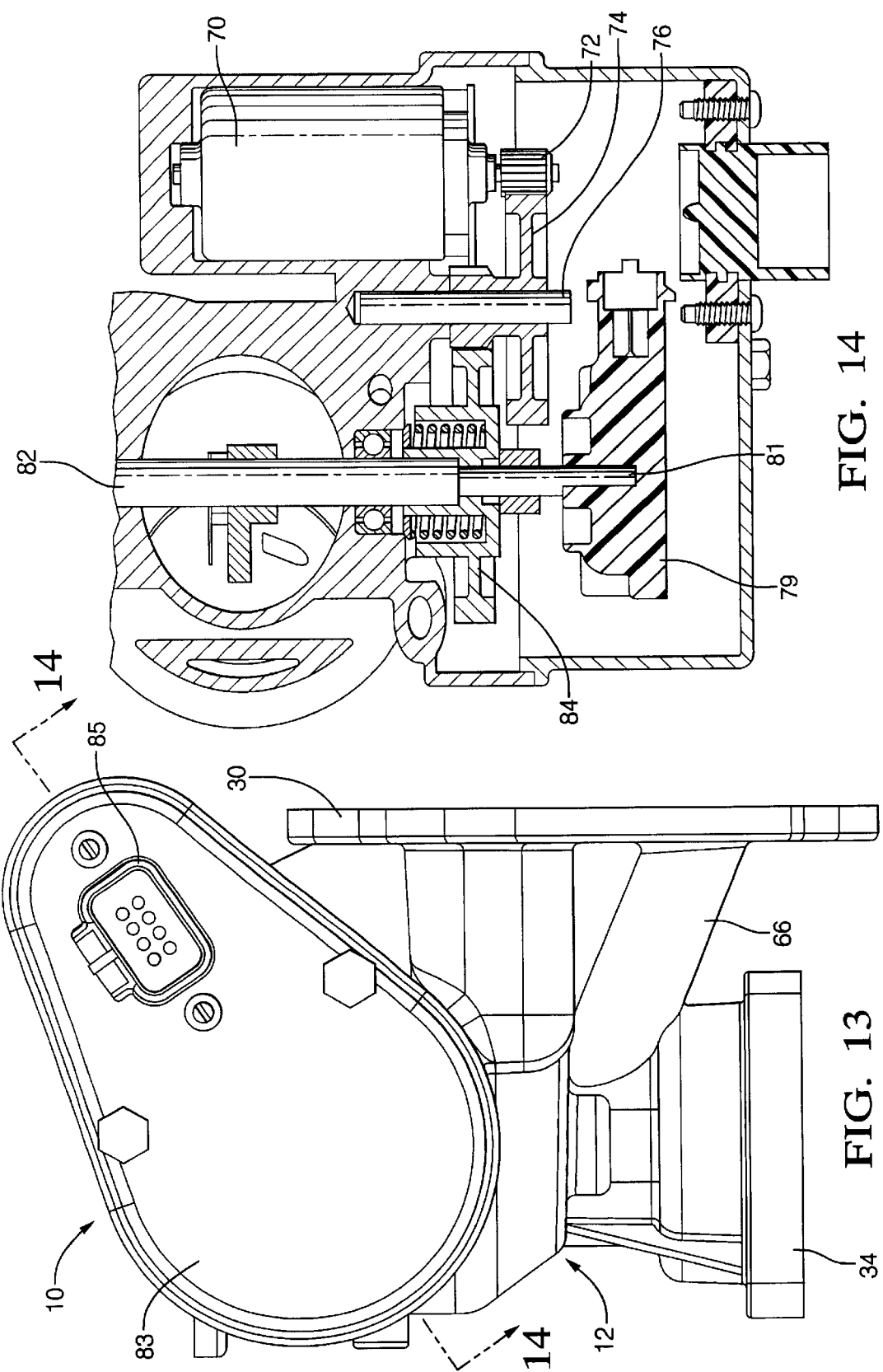
FIG. 13 is an end view of the embodiment, taken from the electromechanical drive end.
FIG. 14 is a cross-sectional view taken along line 14—14 in FIG. 13, showing the relationships among the drive motor, gear train, and camshaft.

Referring also to FIGS. 9 and 11, manifold vacuum regulating valve assembly 16 includes a poppet valve head 92 for mating with seat 94 formed integrally with manifold 12. Seat 94 is formed in a bore 96 defining an air inlet to manifold 12. A valve pintle 98 extends from the underside of head 92 and is received in a pintle bearing insert 100 disposed in a cylindrical boss 102 formed in manifold 12 for guiding the pintle and head during actuation of the valve. A return spring 104 surrounds boss 102 and is seated against a step in boss 102 for urging head 92 toward seat 94, to a normally-closed position. Valve head 92 is further provided with a slot and transverse bore for receiving a roller 106 and pin 107 for following the surface of MVR cam 86. In FIGS. 5, 6, 9, and 11, MVR valve assembly 16 is shown in the open position, permitting the passage of air through inlet bore 96 into intake manifold 12.

Preferably, spring 104 is selected and the valve head and seat are constructed such that assembly 16 is fully closed when the engine is shut down. This prevents entry of additional air into the engine, important for some gasoline engines in preventing the well-known "diesel" effect of continued compressive running after the ignition is off. Prior art butterfly-type manifold entry valves are incapable of providing this advantage. Additionally, the spring strength of spring 104 is preferably selected such that, in the event of valve control failure, the valve can be forced open by air compressed by a diesel supercharger and the engine can continue to run although non-optimally.

Figure 5:
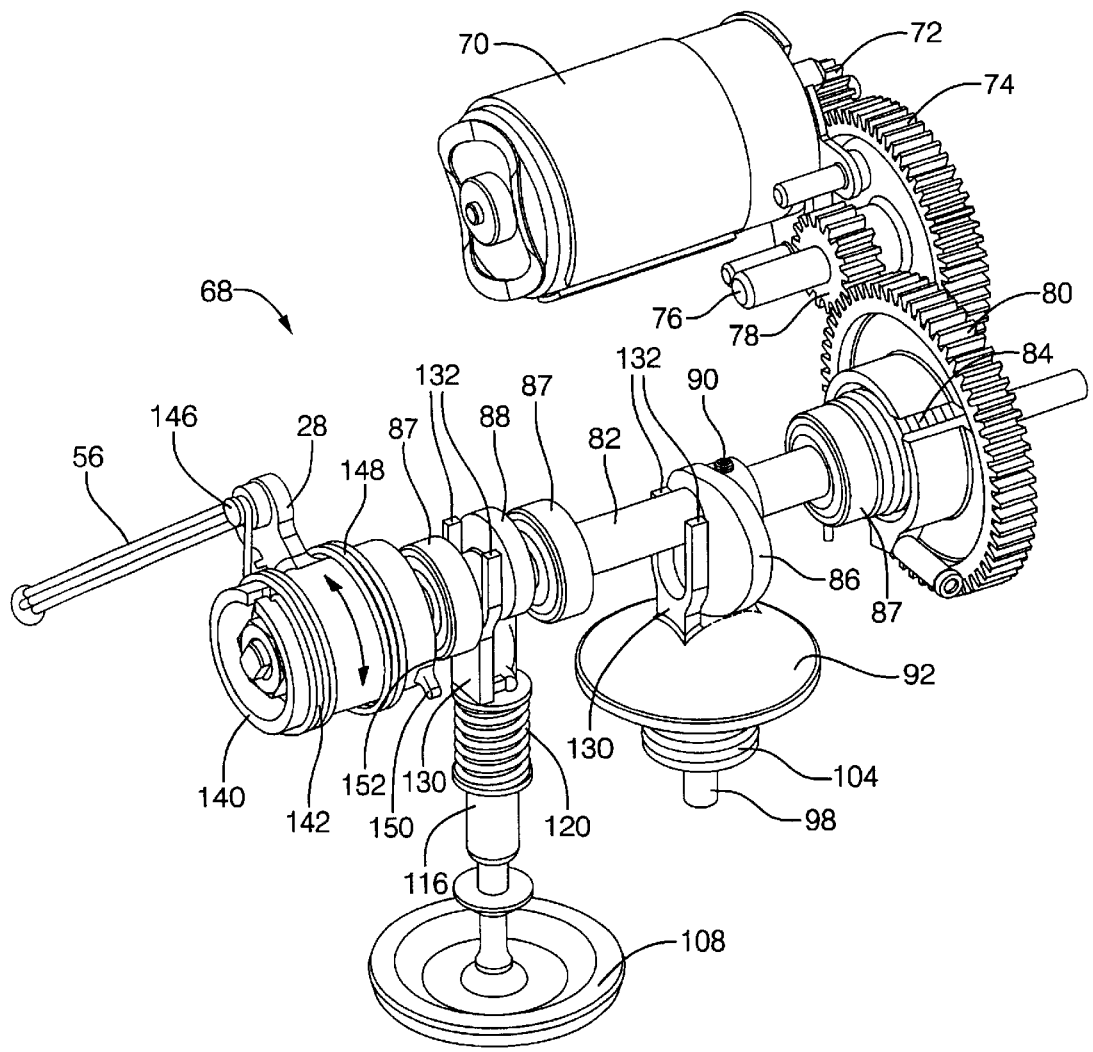
FIG. 5 is an isometric view of the operative mechanism contained in the embodiment as shown in FIG. 1, taken from the same point of view with the manifold omitted.
Figure 6:
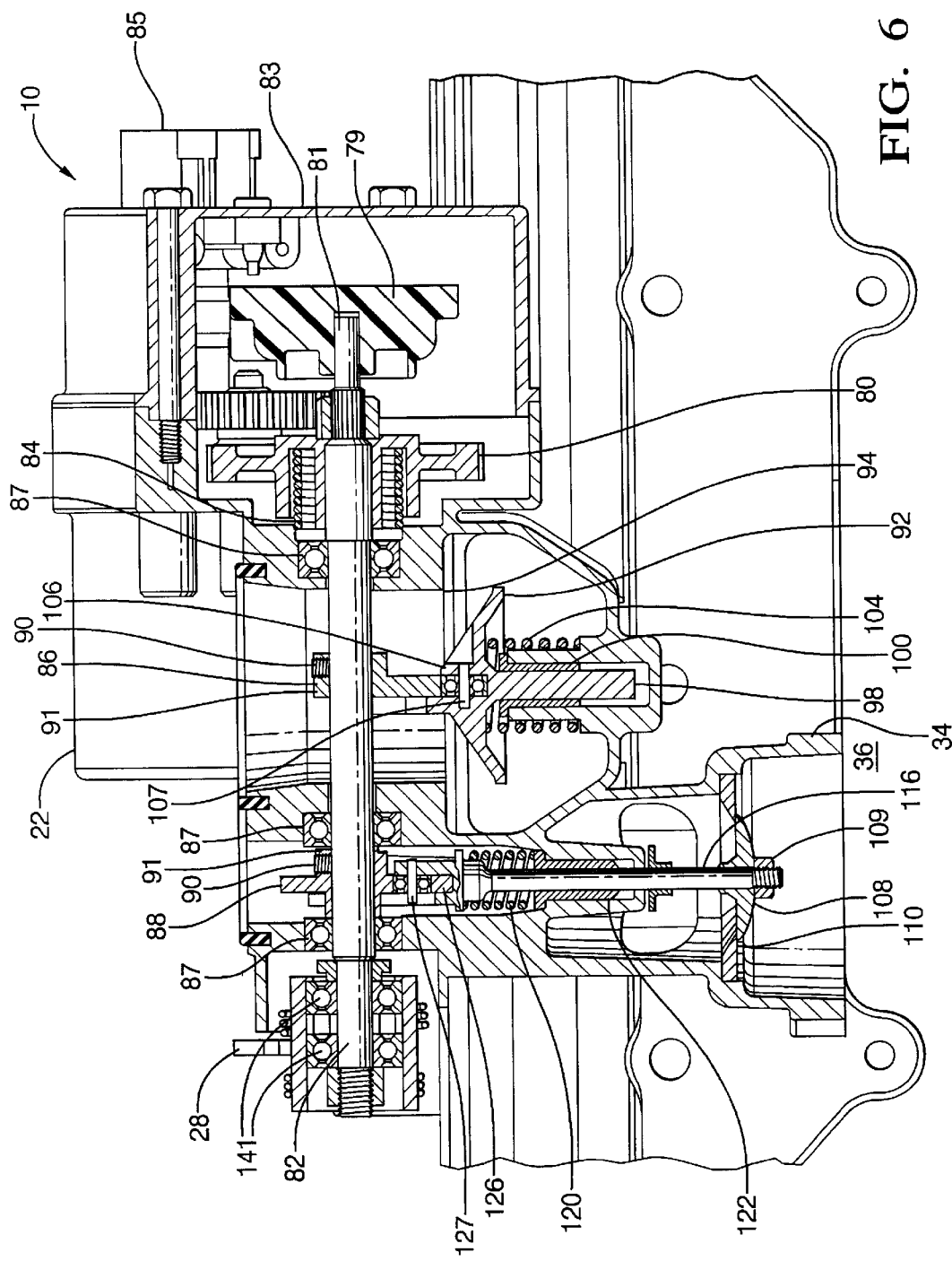
FIG. 6 is an elevational cross-sectional view of the embodiment shown in FIGS. 1 through 5, taken along line 6—6 in FIG. 3.
Figure 7:
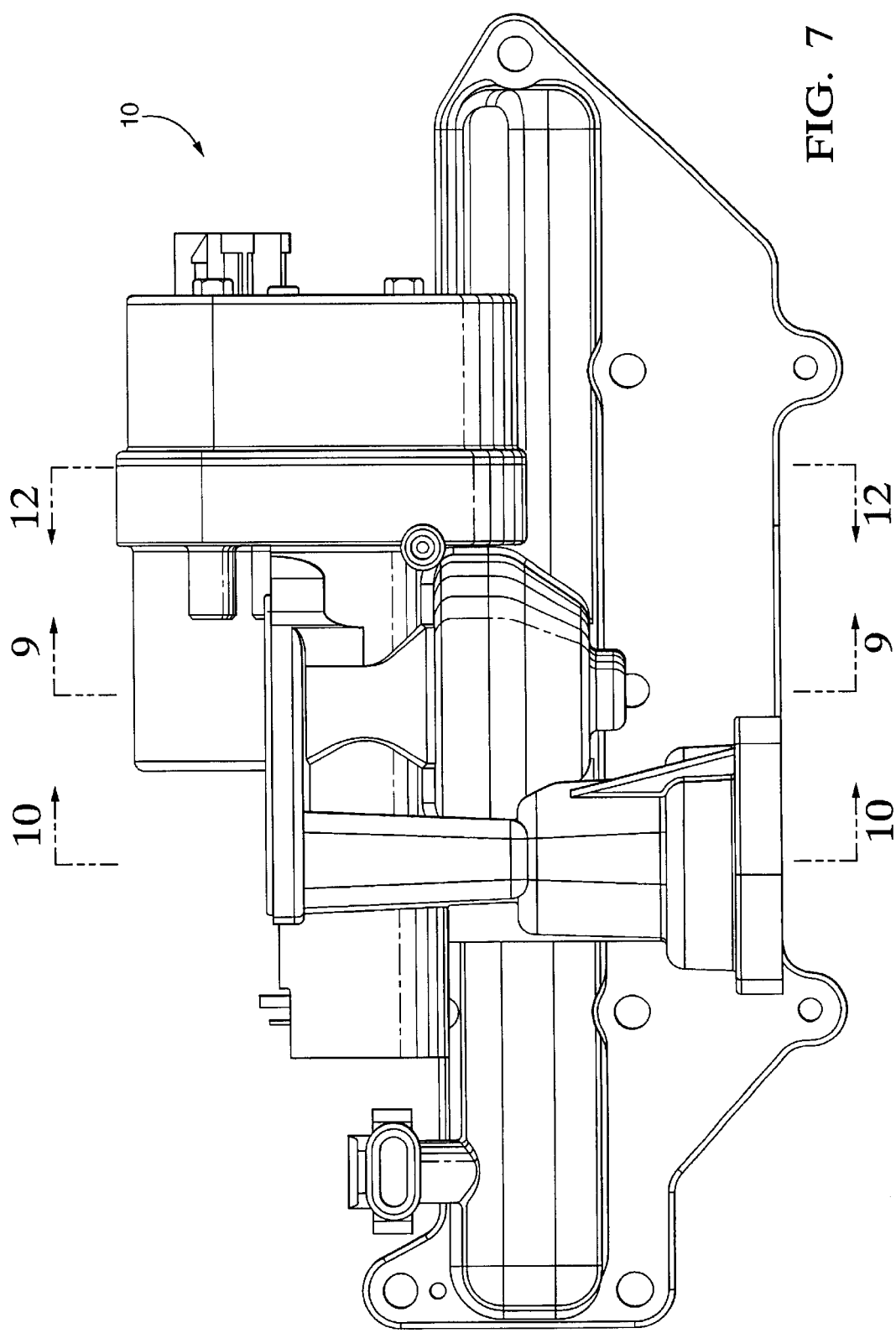
FIG. 7 is an elevational view of the embodiment, showing the locations of various cross-sections taken in the following drawings.
Figure 10:
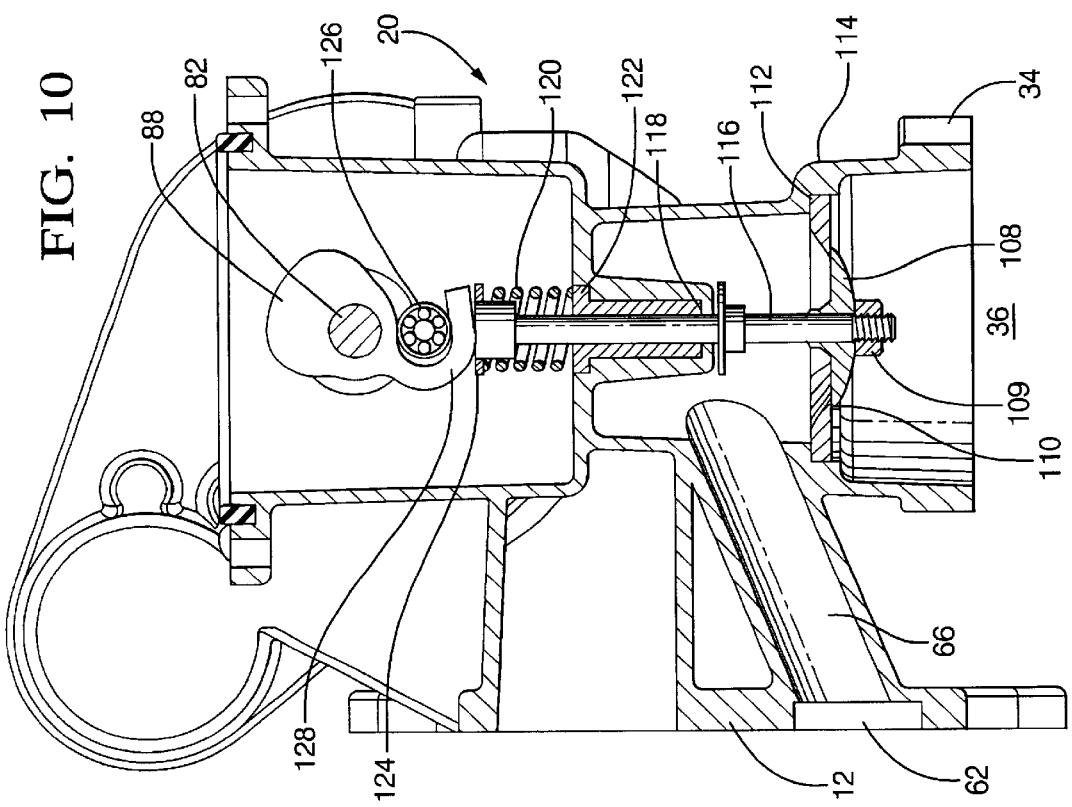
FIG. 10 is an elevational cross-sectional view of the exhaust gas recirculation valve, taken along line 10—10 in FIG. 7.

Referring again to FIGS. 5 and 6, and additionally FIG. 10, exhaust gas recirculation valve assembly 20 includes a poppet valve head 108 for mating with seat 110 inserted into a step 112 in a bell-shaped valve body 114 formed integrally with manifold 12. Body 114 terminates at its lower end in flange 34, as recited above, for mounting onto exhaust manifold 36. A valve pintle 116 extends through head 108 and is secured thereto by nut 109, which sets the tolerance stack-up in the valve assembly. Further, pintle 116 extends from the upper side of head 108 and is received in a stepped bore 118 formed in manifold 12 for guiding the pintle and head during actuation of the valve. A return spring 120 surrounds pintle 116 and is captured between a pintle bearing insert 122 and an annular flange 124 on pintle 116 for urging head 108 toward seat 110, to a normally-closed position. The upper end of pintle 116 is further provided with a slot and transverse bore for receiving a roller 126 and pin 127 for following the surface of EGR cam 88. Referring again to FIG. 8, first conduit 66 connects EGR valve assembly 20 to exhaust gas rail 64. In FIGS. 5, 6, and 10, EGR valve assembly 20 is shown in the closed position, preventing the passage of exhaust gas through flange 34 into exhaust gas rail 64.

Referring to FIG. 10, preferably EGR cam 88 is provided with a hook portion 128 which engages and captures roller 126 when cam 88 is rotated sufficiently counterclockwise, thereby mechanically locking assembly 20 in a closed position.

Referring again to FIGS. 5, 6, and 11, each of valve heads 92, 108 preferably is provided with a yoke element 130 extending from the valve head toward camshaft 82 and terminating in flat fork tines 132 which embrace the camshaft and are closely fitted against their respective cam lobes 86,88. If desired, additional stiffness of the tines may be obtained by connecting the tines with a strap 134, as shown in FIG. 11. The tines thus provide lateral support to the valve pintles 98,116 at their upper ends and thereby relieve side loading of the pintles by the rotary action of the cam lobes. This reduces wear on the pintles and increases the working life and reliability of the valves.

Figure 15:
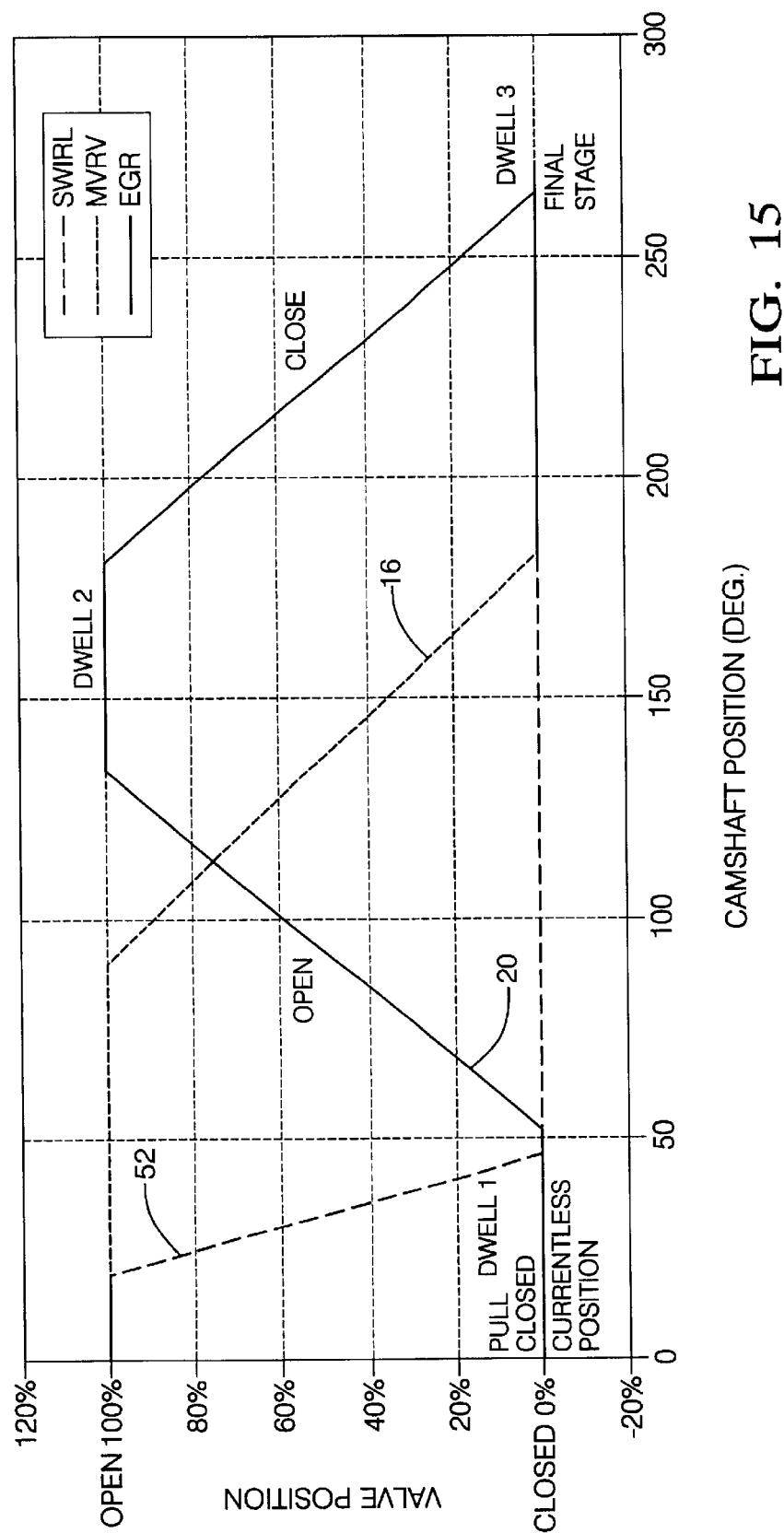
FIG. 15 is a graph showing actuation curves for the swirl valves, manifold vacuum regulation valve, and exhaust gas recirculation valve as optimized for an exemplary diesel engine.
Figure 16:
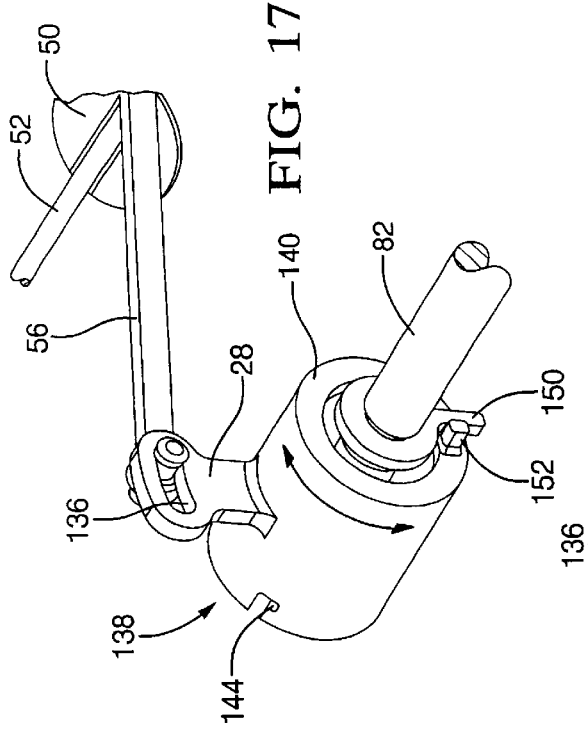
FIGS. 16 through 19 are isometric views from above of the swirl valve control subassembly at four different stages of camshaft rotation.

FIG. 15 shows the operation of an integrated intake manifold assembly in accordance with the invention. Exemplary actuation curves for the swirl valve shaft 52, MVR valve 16, and EGR valve 20 are shown for a typical diesel engine application.

Also refer to FIGS. 16 through 19 wherein the accompanying action of the swirl valve control subassembly 138 is shown. Relative valve position is shown in FIG. 15 as a function of camshaft position. Arbitrarily, the curves represent full engine speed at the far left (270° of camshaft rotation) and engine shutdown at the far right (0° of camshaft rotation).

Beginning at maximum engine speed and air flow, shown at the far left of FIG. 15, the swirl valves 50 (FIG. 16) and the MVR are fully open. There is no exhaust gas recirculation. The EGR valve is both closed and locked shut by hook 128 to prevent its being forced open by high intake manifold pressures from the engine turbocharger which would limit the effectiveness of the turbocharger.

Because first lever actuator 28 has an arcuate slotted opening 136 for connection to link 56, the camshaft and swirl control body 140 are able to rotate counterclockwise sufficiently (about 20°) to unlock the EGR valve before link 56 becomes engaged in controlling the swirl valves. First torsion spring 142 is disposed in torsional compression on body 140 between notch 144 and pin extension 146 (see also FIG. 5), thus urging link 56 toward the valve-closed position shown in FIGS. 16 and 17. Second torsion spring 148 is also disposed in torsional compression on body 140 between lever actuator 28 and a recess in manifold 12 (not shown) but is counter-wound from spring 142. Spring 148 urges actuator 28 counterclockwise as seen in FIGS. 16–19 (springs omitted or partially omitted in FIGS. 17–19 for clarity).

Camshaft 82 is provided with a radial tang 150 which can engage an axial tang 152 extending from body 140. In the 0° camshaft position shown in FIG. 16, body 140 and actuator 28 are are rotated by the camshaft such that the EGR valve is both closed and locked shut by hook 128, as shown in FIG. 10.

Figure 17:
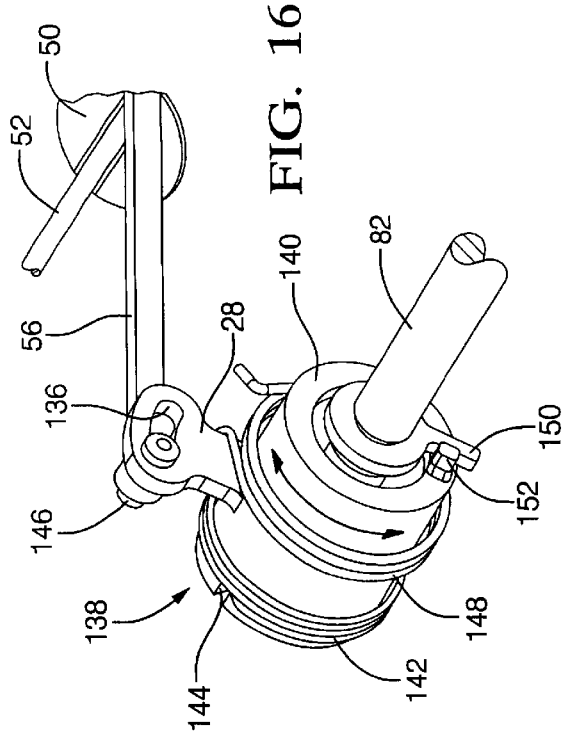

As engine load is decreased (camshaft begins to rotate counterclockwise), the EGR valve is unlocked in the first 25° of rotation. Because first lever actuator 28 has arcuate slotted opening 136 for connection to link 56, the camshaft is able to rotate clockwise sufficiently to unlock the EGR valve without beginning to close the swirl valves, as shown in FIG. 17. Link 56 becomes engaged by actuator 28 at the right end of slot 136.

Figure 2:
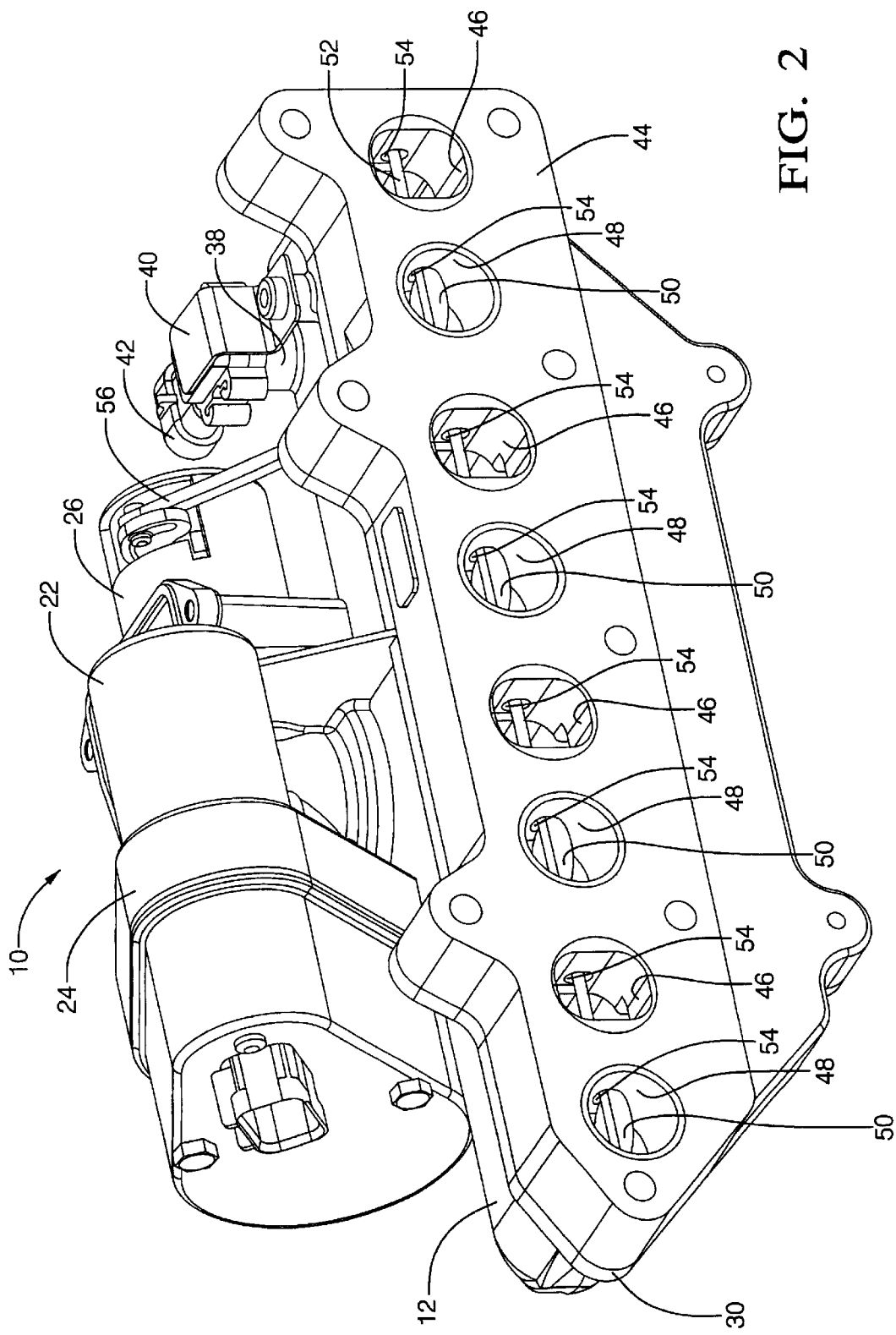
FIG. 2 is an isometric view like that shown in FIG. 1 but taken from the opposite side of the embodiment, showing the swirl plate and swirl valves.
Figure 18:
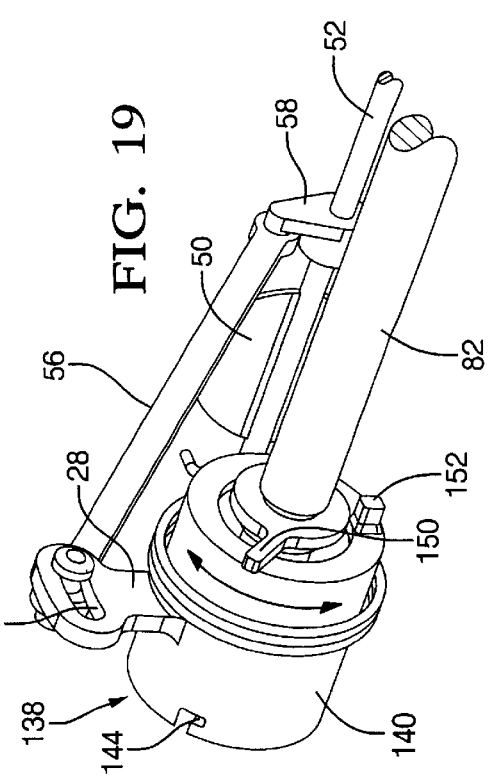

Between about 25° and 45° of rotation, link 56 is drawn counterclockwise by actuating lever 28, closing the swirl valves completely, as shown in FIG. 18, and the engine thus becomes supplied with air solely through first ports 46 (FIG. 2). The link is now prevented by the closing of the swirl valves from traveling farther, so further rotation of body 140 is prevented; the camshaft, however, may continue to be rotated within body 140, as body 140 is rotatably disposed on sealed bearings 141 (FIG. 6) mounted on camshaft 82. As camshaft rotation continues, tang 150 separates from tang 152, as shown in FIG. 19.

At about 50° of camshaft rotation, the EGR valve begins to open, adding exhaust gas to the air entering the cylinders. The MVR valve remains wide open until about 90° of rotation, then begins to close. Because the MVR valve is a poppet valve rather than a conventional rotary butterfly valve, the open area of the valve is linear with respect to pintle motion, and the slope of the curve is readily controlled by appropriately shaping the MVR cam lobe.

The normal operating range of the engine is typically between cam positions of about 100° and 150°. Beyond about 180°, the MVR valve is fully closed (no fresh air is being admitted to the engine) and the EGR valve is fully open. Such a condition may be useful during non-combustive periods, such as going downhill, when fuel is withheld from the cylinders and recirculation of stale exhaust gas can progressively cool the engine cylinders.

Figure 19:
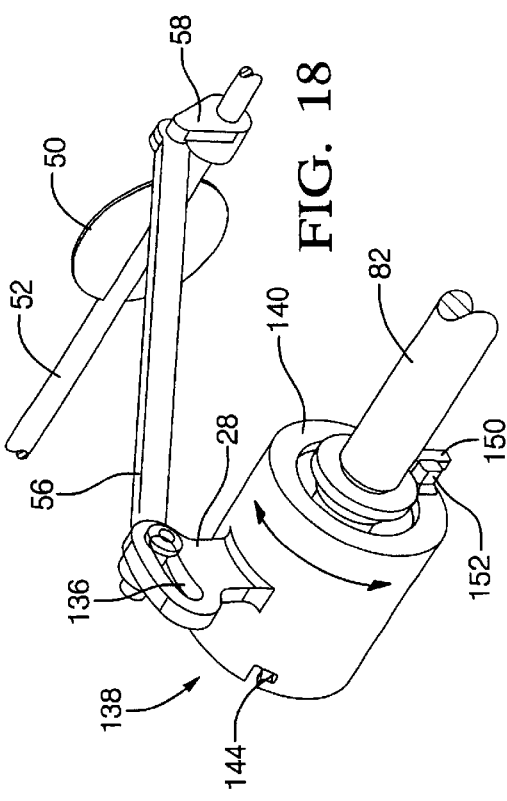

Finally, at engine shutdown, the camshaft is rotated to about 270° to the position shown in FIG. 19 and the swirl, MVR, and EGR valves are closed. When the engine is restarted, the camshaft is automatically rotated clockwise through a predetermined angle to provide optimal opening settings for the MVR and EGR valves, the swirl valves remaining closed until high engine speed is again required.

All the recited camshaft positions are programmed into a conventional engine control module in known fashion, which module receives various engine inputs including manifold pressure signals from sensor 40 and cam position signals from sensor 79. The ECM controls the action of motor 70 responsive to these and other signals and algorithms stored therein.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An integrated intake manifold assembly for an internal combustion engine, comprising:
   a) an intake manifold attachable to said engine for providing combustion air thereto;
   b) an inlet valve assembly having a valve body formed in said intake manifold for regulating flow of air into said manifold; and
   c) an exhaust gas recirculation valve assembly having a valve body formed in said intake manifold for regulating flow of recirculated exhaust gas into said engine.

2. An assembly in accordance with claim 1 wherein said inlet valve assembly and said exhaust gas recirculation valve assembly each includes a poppet valve.

3. An assembly in accordance with claim 2 further comprising a camshaft rotatably disposed on said intake manifold and having cams engageable with said inlet valve assembly and said exhaust gas recirculation valve assembly for controllably actuating said valves simultaneously.

4. An assembly in accordance with claim 3 further comprising drive means for controllably rotating said camshaft to actuate said valves.

5. An assembly in accordance with claim 4 wherein said drive means includes a DC motor and gear train disposed on said intake manifold.

6. An assembly in accordance with claim 4 further comprising means for sensing rotary position of said camshaft.

7. An assembly in accordance with claim 3 further comprising a yoke attached to a valve head in at least one of said inlet valve assembly and said exhaust gas recirculation valve assembly, said yoke having a plurality of tines embracing said camshaft.

8. An assembly in accordance with claim 1 wherein said engine is fueled by gasoline and spark ignited and wherein said inlet valve assembly is adapted as a primary throttle valve for said engine.

9. An assembly in accordance with claim 1 wherein said engine is throttled by controllably varying the lift of engine intake valves and wherein said inlet valve assembly is adapted as a manifold vacuum regulating valve.

10. An assembly in accordance with claim 1 wherein said engine is fueled by diesel fuel and is compressively ignited and wherein said inlet valve assembly is adapted as a manifold vacuum regulating valve.

11. An assembly in accordance with claim 10 further comprising:
   a) a swirl plate for disposition between said intake manifold and said engine;
   b) a plurality of first ports and second ports in said swirl plate for conveying air from said intake manifold to said engine;
   c) a plurality of swirl valves disposed in said plurality of second ports; and
   d) means pivotably connected to said camshaft for controllably actuating said swirl valves.

12. A multiple-cylinder internal combustion engine, comprising an integrated intake manifold assembly including
   an intake manifold attachable to said engine for providing combustion air thereto,
   an inlet valve assembly having a valve body formed in said intake manifold for regulating flow of air into said manifold, and an exhaust gas recirculation valve assembly having a valve body formed in said intake manifold for regulating flow of recirculated exhaust gas into said engine, said inlet valve assembly and said exhaust gas recirculation valve assembly each including a poppet valve,
   a camshaft rotatably disposed on said intake manifold and having cams engageable with said inlet valve assembly and said exhaust gas recirculation valve assembly for controllably actuating said valves simultaneously, and
   drive means for controllably rotating said camshaft to actuate said valves.

* * * * *